June 19, 1956 J. M. CUNNINGHAM 2,751,008

STORAGE MECHANISM

Original Filed May 1, 1952 4 Sheets-Sheet 1

INVENTOR
JAMES M. CUNNINGHAM
BY
G. R. Gugger
AGENT

INVENTOR
JAMES M. CUNNINGHAM
BY
G. R. Gugger
AGENT

June 19, 1956 J. M. CUNNINGHAM 2,751,008

STORAGE MECHANISM

Original Filed May 1, 1952 4 Sheets-Sheet 3

INVENTOR
JAMES M. CUNNINGHAM
BY
G. R. Gugger
AGENT

June 19, 1956 J. M. CUNNINGHAM 2,751,008

STORAGE MECHANISM

Original Filed May 1, 1952 4 Sheets-Sheet 4

INVENTOR
JAMES M. CUNNINGHAM
BY
G. L. Gugger
AGENT

United States Patent Office 2,751,008

Patented June 19, 1956

2,751,008

STORAGE MECHANISM

James M. Cunningham, Endicott, N. Y., assignor to International Business Machines Corporation, New York, N. Y., a corporation of New York Original application May 1, 1952, Serial No. 285,566. Divided and this application May 28, 1953, Serial No. 357,994

3 Claims. (Cl. 164—115)

This invention relates to a machine for perforating record cards, and more particularly to a perforating machine for converting small pierced holes on record cards into larger holes.

This application is a division of the application in the name of J. M. Cunningham, Serial No. 285,566, filed May 1, 1952. In the present application, the disclosure and claims are restricted solely to improvements in the storage mechanism.

In the illustrative embodiment, the present invention is shown arranged for operation in the punching section of the well-known type of high speed reproducing perforating machine, described in Reissue Patent 21,133.

The present invention comprises a novel rotary type of data storage means, which may be operated in synchronism with the record feeding mechanism in the punching section and/or the reading section of the above referred to high speed reproducing machine. The sensed data, represented by the differentially disposed pierced holes, selectively operates the storage means, which stores the data for a predetermined number of cycles. Upon the passage of the sensed record cards under the punches, the said synchronously operated storage means become effective to control the operations of the punches, thereby effecting perforating of the sensed record cards in positions corresponding to the sensed pierced holes. The sensing means employed can be used to sense standard punched holes in the record card, either alone or in combination with the pierced holes and it is to be noted that concurrent entry of both types of the sensed data can be made into the storage means should it be desired to convert the pierced holes in one field of the card to standard punched holes in another field of the card and at the same time transpose any standard punched holes in said first field in the card to said other field of the sensed record card.

In addition, it has been found that some applications may require the recording of pierced holes in records having differentially positioned conductive marks thereon, or vice versa, in which case, it may be desirable to convert both the pierced holes and the conductive marks into standard punched holes. As a result the necessary sensing mechanism is provided, which may be of the type described in U. S. Patent 2,275,396, for sensing differentially positioned conductive marks on successive record cards for effecting the punching of perforations thereon, in positions corresponding to the sensed conductive marks. The sensed data, represented by the differentially disposed conductive marks are stored in the storage means for a different predetermined number of cycle points from the pierced hole entries and all of the perforations corresponding to the sensed conductive marks and pierced holes are concurrently punched.

Accordingly, an object of the present invention is to provide an improved data storage device, which is operated in synchronism with the record feeding means, for controlling the perforating operations at a later time in the machine cycle.

Another object of the present invention resides in the provision of an improved data storage device, as in the preceding object, wherein sensed data representing pierced and/or punched holes may be received and stored for a predetermined number of cycle points and also sensed data represented by conductive marks may be received and stored for a different predetermined number of cycle points.

Other objects of this invention will be pointed out in the following description and claims and illustrated in the accompanying drawings, which disclose, by way of example, the principle of the invention and the best mode, which has been contemplated, of applying that principle.

Figure 1:
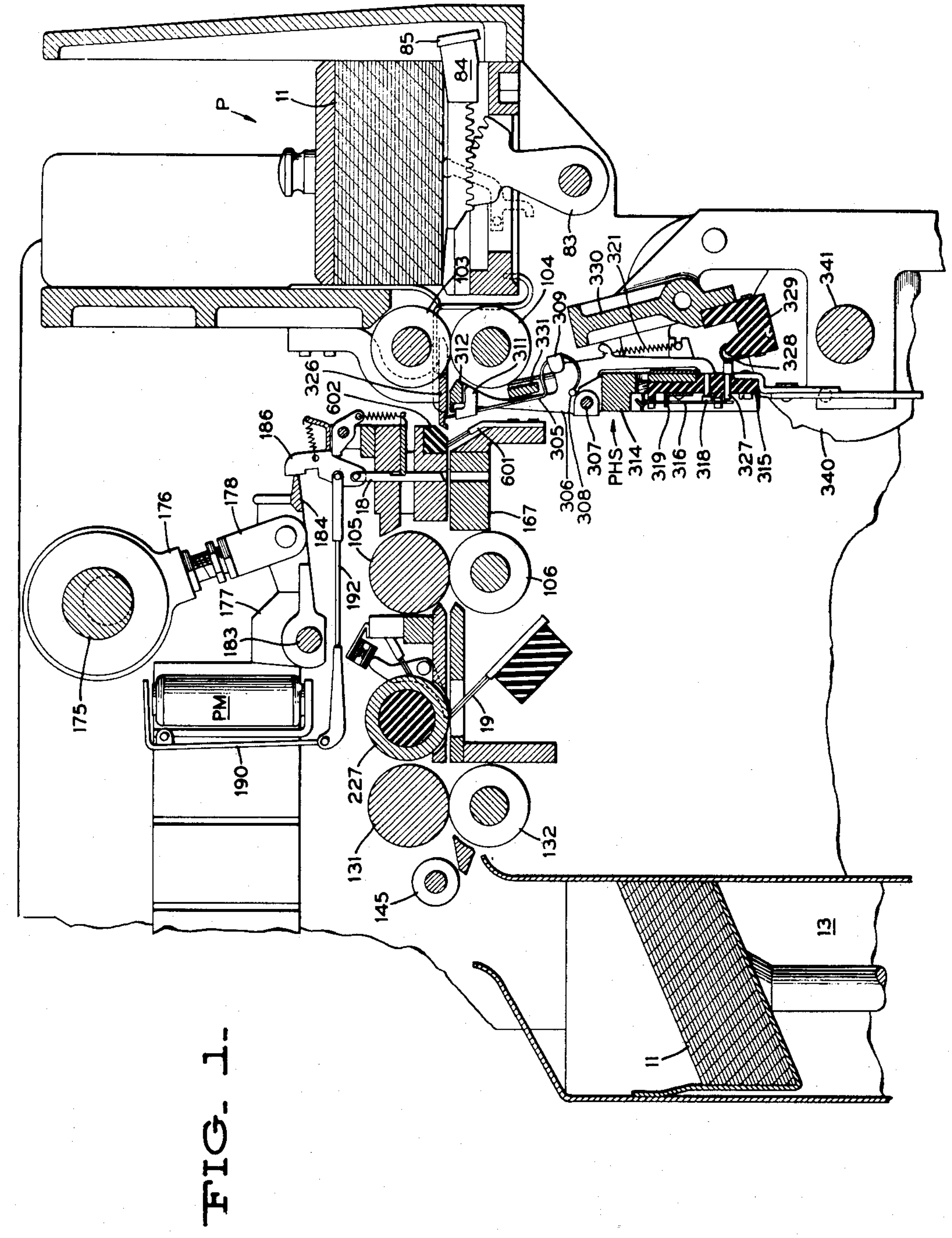
Fig. 1 is a sectional elevation view of the machine showing the feeding, sensing and perforating devices.

The operation of one type of machine to which the invention may be applied will first be briefly explained with reference to Fig. 1 and thereafter the manner in which the invention is applied thereto will be set forth, it being understood that the present invention may be used with other types of record controlled machines generally. Reference may be had to Reissue Patent 21,133 for a more detailed explanation of the main machine, which is commercially known as the IBM reproducing punch. The present embodiment is concerned with only the punching section of said machine and therefore, it is deemed unnecessary to show or describe the read section of the reproducing machine. To facilitate cross reference the same reference characters will be employed as in the patent to like elements and the elements of the present invention will begin with the number 344.

The record cards 11 are fed from the hopper P by the oscillating arm 83, reciprocating slide 84, and picker 85 to the feed rollers 103, 104, which rollers convey the said card past the pierced hole sensing unit, indicated generally as PHS on Fig. 1. It will be noted that sensing unit PHS replaces the usual punch master card brushes 17 shown in the said reissue patent. The card is then moved past a mark sensing station, which is disposed ahead of the punching station and comprises the sensing brush assembly 601 and insulating bar 602 (shown similarly in Patent 2,275,396). From the mark sensing station, the card is conveyed to and past the punching station, comprising a row of punches 18 and die 167. Rollers 105, 106 then convey the punched card past the sensing station, comprising brushes 19 and contact roller 227, and, by means of rollers 131, 132 and deflecting roller 145, the said punched card is conveyed to discharge hopper 13. The sets of rollers which convey the record card through the punching section of the machine are intermittently driven, so that the card is advanced in steps, with each row of index point positions pausing momentarily in the punching position to receive a perforation, if, at such time the magnet PM is energized.

Energization of the said magnet PM will rock its armature structure 190, drawing a link 192 toward the left to effect coupling between an interposer 186 and a plate 184. The plate 184 is carried by member 177 pivoted at 183 and oscillated, by means of a link 178 connected to an arm 176 on shaft 175.

The description, up to this point, relates briefly to the prior art machine described in greater detail in the aforementioned reissue patent which can be referred to for the description of the starting and operating control elements, and circuits for rendering the mechanism, which will be referred to hereinbelow, continuously operated.

In the description to follow, the record cards containing the pierced holes and/or the conductive marks are placed in the hopper P, and are fed face down, twelve edge first, individually and successively therefrom by the card picker 84 to the feed rollers 103, 104.

Figure 3:
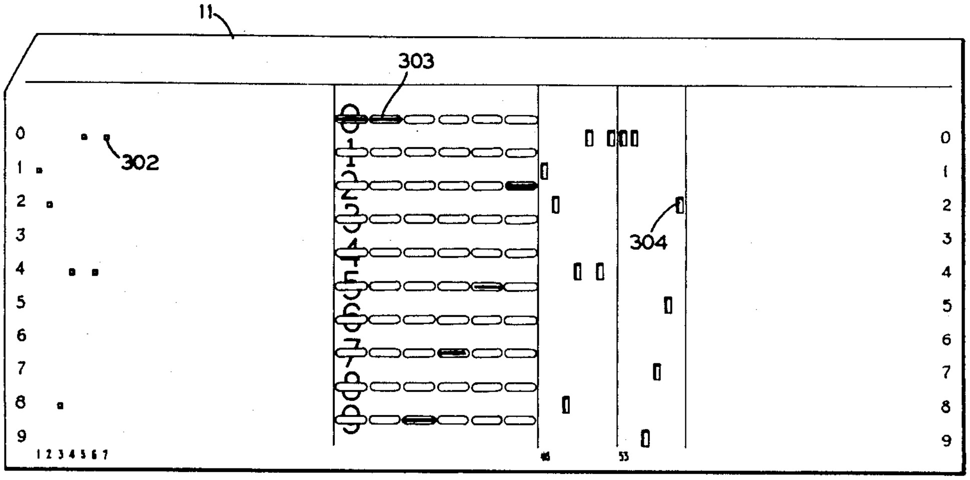
Fig. 3 is a view of a typical record card.

A typical record card is shown in Fig. 3 having pierced holes 302 at the "8," "4," and "0" index point positions and conductive marks 303 formed at the "9," "7," "5," and "2" index point or marking positions. This data is also shown transposed into standard size perforations 304, the perforations corresponding to the data represented by the pierced holes being disposed in columns 46, through 52 and the perforations corresponding to the data represented by the conductive marks being disposed in columns 53 through 58 of the record card.

These cards are then fed by the said feed rollers past the pierced hole sensing station PHS. The pierced hole sensing unit (Fig. 1) is fully shown and described and claimed in an application in the name of J. M. Cunningham, Serial No. 357,993, filed May 28, 1953, which application is in turn a division of the application in the name of J. M. Cunningham, Serial No. 285,566, filed May 1, 1952.

The pierced hole sensing unit comprises a plurality of spaced sensing wires 305 which are individually disposed on a plurality of spaced levers 306 pivoted on a bar 307. There are, in fact, four hundred of these sensing wires, five for sensing each columnar position of the standard card and they are arranged with respect to the punching station, so that the index mark positions on the card are sensed three cycle points before the corresponding index mark positions sensed are fed to the punching station.

There are eighty of the levers 306, each lever supporting five sensing wires placed side by side. The lower extremity of each sensing wire is attached around a stud 308 on its associated lever and has a bent portion which is retained in an ear 309 of the lever in a fashion so that the upper extremity of the sensing wire extends up between the sides of a bracket member 311 integral with each lever 306. The bracket members 311 extend into slots of a comb plate 312 which serves as a part of the card bed for the punch feed.

The lever supporting bar 307 is mounted in a slotted block 314 which is suitably attached to the main casting 315, of an insulating material, of the sensing unit.

Mounted alongside the casting 315 and extending across the width of the sensing unit is a series of one hundred and sixty contact wires 316, there being two wires for each column of the record card. These contact wires are held in position and plungers 318 provided which serve to force the middle of the wires against the inner edge of individual slots in a conducting strip 319, which is attached to the main casting 315. The plungers 318 are normally retained in an extended position against the contact wires by means of the lower extremities of the levers 306. Each lever is normally urged in a clockwise direction about bar 307 by means of a spring 321.

As shown in Fig. 1, when there is no card at sensing station, the sensing wires extend against one side of a notch in the underside of a plate 326 and the lower extremities of the contact wires are out of contact with the ends of a series of conducting inserts 327 mounted in the casing 315, there being one insert for each two contact wires.

Assuming that a blank record card is passing through the sensing unit it will be understood that the position of the components will not change noticeably and the contact wires and conducting inserts will still be out of contact with each other. However, when a sensing wire encounters a pierced hole in a card the position of the components will change. The sensing wire will now extend into the pierced hole and as the card is fed it pulls the sensing wire along with it causing the related lever 306 to pivot counterclockwise. The lower extremity of the lever will be moved away from plunger 318 allowing the contact wires to push said plunger inwardly until the lower extremity of the contact wire contacts one end of the conducting insert 327.

The other end of the conducting insert is in contact with a contact wire 328, of which there is one for each insert, attached to an insulator block 329. The block 329 is attached to a bracket member 330 mounted in the frame of the punching machine. The contact wires 328 serve to complete circuits from the inserts 327 to the entry magnets of the storage unit by the well-known plugboard connections.

The sensing components are restored to their normal position after the pierced hole has moved out of sensing position and the contact between the insert 327 and the contact wire will be broken. The restoring of the components is accomplished by means of a restoring bail 331 which is suitably cammed down once each cycle point against the bent portion of all the sensing wires. As a result, the wires are pulled down out of the pierced holes and the levers 306 are pivoted clockwise, by springs 321, until their lower extremities strike the main casting 315 and restore the plungers 318. When the bail 331 is returned upward, the sensing wires move upward slightly with respect to their levers, due to the tension in the bends, and are ready to sense the next perforation.

From the pierced hole sensing unit PHS, the cards are moved past the mark sensing station comprising the conventional mark sensing brush assembly 601 and insulating bar 602. The mark sensing brushes are arranged with respect to the punching station, so that the index mark positions on the card are sensed two cycle points before the punchings corresponding to the index mark positions sensed are made at the punching station. The mark sensed readings are accordingly entered into the storage unit, as will be described by the well-known plugboard connections and stored for two cycle points.

Figure 2:
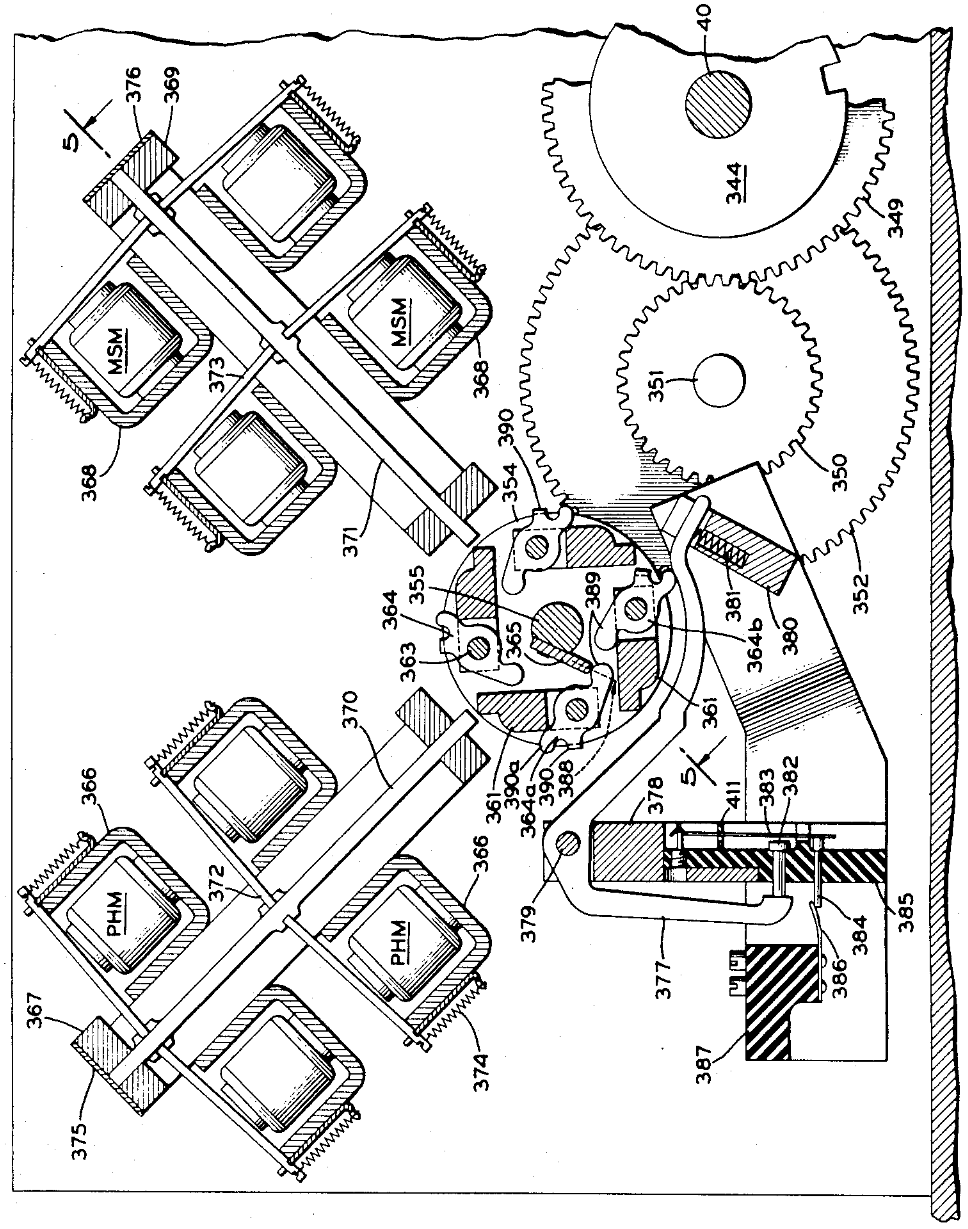
Fig. 2 is a side elevation showing the arrangement of the rotary storage device and read-out mechanism.
Figure 4:
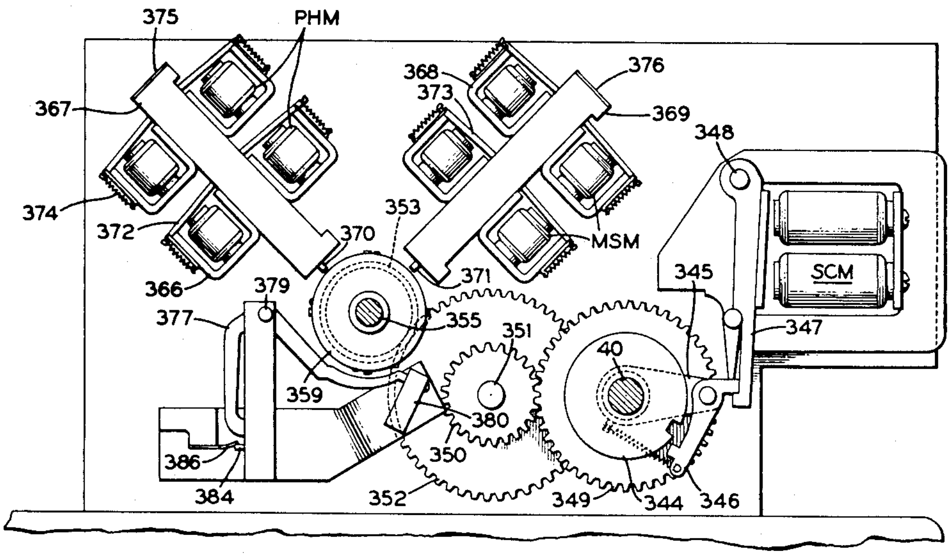
Fig. 4 is a side view showing the driving connections to the rotary storage device.
Figure 5:
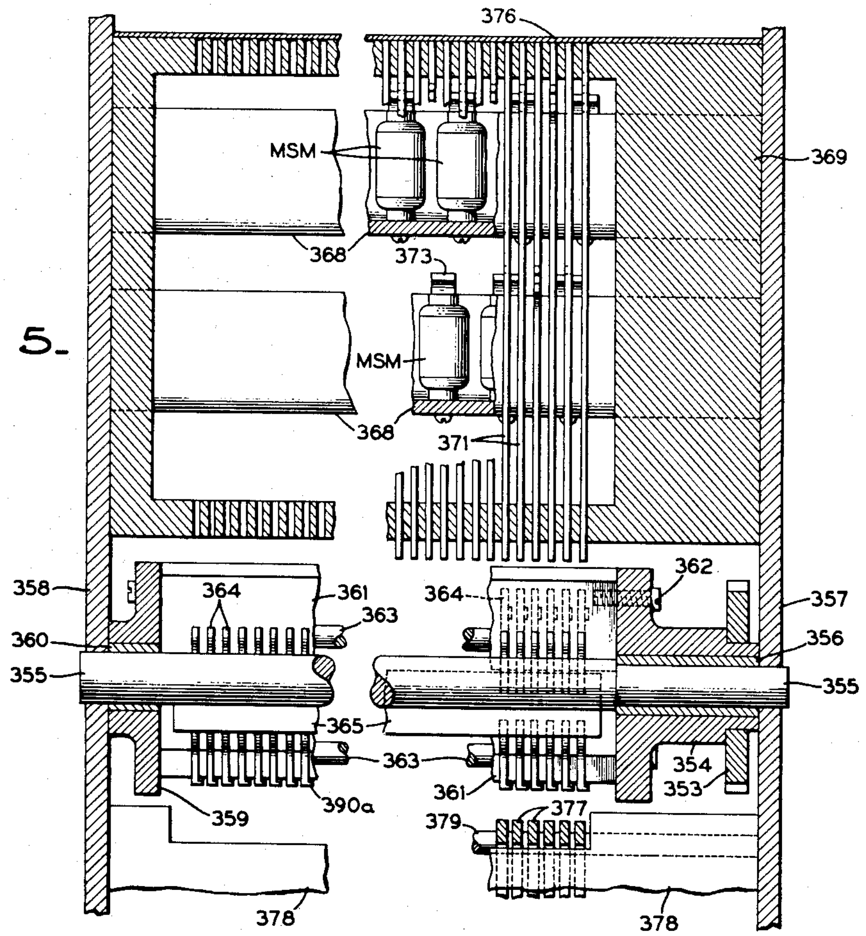
Fig. 5 is a sectional view taken on line 5—5 of Fig. 2.

The data storage device for storing the pierced hole and/or punched hole readings for three cycle points and the mark sensed readings for two cycle points is shown in Figs. 2, 4, and 5. Referring to Fig. 4, a storage unit clutch is operated concurrently with the punch clutch of the punching machine. A notched disc 344 is fixed on the continuously running shaft 40 of the punching machine. Adjacent the disc is an arm 345 loose on the shaft 40 and carrying a clutch pawl 346 pivoted thereon. The pawl has an extension adapted to fit into the notch in disc 344 and is urged to engage the disc by a suitable spring, not shown. However, the pawl is held disengaged by an armature latch 347 which engages an extending arm on the pawl. When a storage clutch magnet SCM is energized, the associated armature is attracted and latch 347 is rocked about a pivot 348, releasing pawl 346 and connecting arm 345 to the driving disc 344. It will suffice to say that magnet SCM is electrically connected in parallel with the punch clutch magnet PCM of the punching machine and would be energized by the same circuit (see Fig. 10*a* of Patent Re. 21,133) that normally energizes said punch clutch magnet.

Arm 345 drives a gear 349, loose on the shaft 40 and attached to said arm. Gear 349 drives a gear 350 loose on a stud 351. A gear 352, integral with gear 350, drives a gear 353 and the storage device.

Referring to Fig. 5, the gear 353 is fixed to a side plate 354 rotatively mounted on a shaft 355 by means of a bearing 356. The shaft 355 is fixed to side frames 357, 358, of the storage device and rotatively supports, at its other end, a side plate 359 by means of a bearing 360. The side plates 354 and 359 are connected by four bars 361 (see also Fig. 2) equally spaced apart and attached to said side plates by means of screws 362.

The side plates and bars constitute the framework of a rotary storage drum which functions to store the sensed data for either two or three cycle points and then to actuate a device for reading out the stored data. Extending through each of the bars 361 is a rod 363 which pivotally supports a series of eigthy trip levers 364 positioned in eighty slots in the bar. The trip levers are individually actuated by a set-up mechanism, to be described, and in their actuated position, each trip lever represents a stored code element. A restoring bail 365 is rigidly attached to the shaft 355 for the purpose of restoring the trip levers after the stored digits have been read out of the storage device.

Each row of eighty trip levers represents an index point position across the eighty columns of the record card. It is possible, then, in one revolution of the drum, to store readings from four index point positions of the card such as, for example, the digits "1" through "4." To take care of the twelve index point positions on the card, the storage drum is caused to rotate three and one-half times faster than the card feed, that is, three and one-half times per machine cycle. On a fourteen cycle point machine, as in the present case, the three revolutions of the drum will allow the storage of readings from the twelve index point positions with the one-half revolution taking care of the two cycle point distance between the index point positions on successive cards.

The set-up mechanism for actuating the trip levers in accordance with the data sensed on the card comprises two magnet units disposed between the side frames 357 and 358, with the magnets of each unit being arranged in four banks. Referring to Fig. 2, the left hand magnet unit consists of the eighty magnets PHM attached to bracket plates 366 which are fastened to opposite sides of a frame member 367 extending between the side frames 357 and 358. The PHM magnets receive impulses from the pierced hole sensing wires. The right hand magnet unit, similarly, consists of twenty-seven magnets MSM attached to bracket plates 368 which are fastened to opposite sides of a frame member 369 extending between the side frames 357 and 358. The MSM magnets receive impulses from the mark sensing brushes.

Positioned within each magnet unit is a series of interposers, indicated at 370 and 371. The interposers are slidable within their respective frames 367, 369 and each one has a notched portion adapted to receive the end of a magnet armature, as indicated at 372, and 373, of the particular magnet PHM or MSM associated therewith. Suitable armature springs 374 serve to retain the interposers in an upward position against top plates 375 and 376 of the frame members 367 and 369 when the magnets are de-energized.

Before describing the storage operation, it is thought advisable to describe the read-out mechanism which serves to distribute the stored readings to the punch magnets of the punching machine. The read-out mechanism comprises a series of eighty contact levers 377, one for each columnar position. The contact levers are positioned in slots in a frame member 378 and are pivoted on a rod 379 which extends through said frame member. One end of each contact lever is spring biased in a slotted frame member 380 by means of a spring 381 so that each contact lever normally extends into the path of any of its associated columnar trip levers 364 that may have been actuated.

The other ends of the contact levers 377 actuate a contact arrangement which is identical to the one previously described in connection with the pierced hole sensing unit. It will suffice to say, then, that there are eighty plungers 382, actuated by said contact levers, which effectively cause the make or break of eighty pairs of contact wires 383 with eighty conducting inserts 384 suitably mounted in a non-conducting frame member 385. The conducting inserts contact a series of eighty read-out contact blades 386 attached to a non-conducting frame member 387. The read-out contact blades control energization of the punch magnets of the punching machine through the usual plugboard connections.

As an example of how the storage device operates, assume that at "6" time on the machine index, a pierced hole representing the digit "9" is sensed by the pierced hole sensing unit. The sensing of the "9" digit causes the energization of an associated magnet PHM which, through the movement of its armature, pushes a related interposer downward into the path of the trip levers 364.

The storage drum rotates in a clockwise direction and is timed so that at any index point time the center line of the restoring bail 365, indicated by the dotted line 388 on Fig. 2, will extend through the center of a knockoff tip 389 of one of the trip levers. Assume, then, that the trip lever, indicated as **364*a* is in such a position when the digit "9" is sensed. The trip lever 364*a* is carried in a clockwise direction and as it sweeps past the actuated interposer, a bent over ear 390 on said trip lever will strike the end of the interposer causing the lever to pivot counterclockwise until its knockoff ear 389 strikes the edge of the related bar 361 (see trip lever 364*b***). In such a position the trip lever represents a stored code element.

The trip levers are positioned one cycle point apart and it can be seen that it will take the trip lever **364*a* three cycle points to reach the position where an ear 390*a* can cam one of the contact levers 377 downward. Accordingly, at "9" time on the index, lever 364*a* will cam its related contact lever down to complete a circuit through the read-out contact to the punch magnet to punch the digit "9." As each trip lever sweeps past the restoring bail 365, its knockoff tip 389 will strike the end of the bail causing the lever to pivot clockwise until the ear 390*a* strikes the edge of the related bar 361**. Thus, the lever is reset to its normal position ready to receive another entry.

It can be understood that the storage device operates in the same manner as just described when sensing the standard size perforations. When sensing the conductive marks, the operation is the same except, that due to the position of the magnets MSM and the interposers 371, storage is for two cycle points instead of three to correspond with the position of the mark sensing brushes 601.

As previously mentioned, after punching, the cards are conveyed by the rollers 105, 106 past the brushes 19 which are the well-known gang punch brushes of the standard punching machine and which may be utilized in the present machine for a gang punching operation if desired. The cards are then conveyed by the rollers 131, 132 and deposited in the discharge hopper 13.

While there have been shown and described and pointed out the fundamental novel features of the invention as applied to a single modification it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a record controlled machine having at least two sensing mechanisms arranged a predetermined distance apart, a data storage device comprising, a group of setting means associated with each sensing mechanism and under control thereof, a row of interposers for each group of setting means and actuated thereby, said rows of interposers being arranged a predetermined distance apart according to the disposition of said sensing mechanisms, a plurality of settable elements, rotary means for carrying said settalbe elements past said rows of interposers, said interposers which are actuated being effective to set different ones of said settable elements at different times depending on the predetermined distance at which said interposers are disposed to store readings from both of said sensing mechanisms, and a single row of contact means actuated by the settable elements that have been set, upon further rotation of the latter to effect read out of said stored readings.

2. In a record controlled machine having at least two sensing mechanisms arranged a predetermined distance apart, a data storage device comprising, a row of fixed electromagnets and associated armatures for each sensing mechanism and under control thereto, a row of interposers for each row of electromagnets and actuated by said armatures upon energization of said electromagnets, said rows of interposers being arranged a predetermined distance apart according to the disposition of said sensing mechanisms, a plurality of settable elements, rotary means for carrying said settable elements past said rows of interposers, said interposers which are actuated being effective to set different ones of said settable elements at different times depending on the predetermined distance at which said interposers are disposed to store readings from both of said sensing mechanisms, and contact means comprising a single row of operating elements and an associated row of contacts actuated thereby, said operating elements being actuated by the settable elements that have been set, upon further rotation of the latter to effect read out of said stored readings.

3. The invention set forth in claim 2, wherein, a single bail member is provided for effecting resetting of the settable elements that have been set, after the engagement of the latter with the said contact means.

References Cited in the file of this patent

UNITED STATES PATENTS

| | | |
|---|---|---|
| 2,007,391 | Bryce | July 9, 1935 |
| 2,275,396 | Johnson | Mar. 3, 1942 |